United States Patent [19]

Bennett et al.

[11] 4,302,654
[45] Nov. 24, 1981

[54] MICROPERFORATION OF CIGARETTE TIPPING PAPER BY USE OF LASER BEAM

[76] Inventors: William T. Bennett, Cary; Bennie L. Parks, Durham, both of N.C.

[21] Appl. No.: 47,294

[22] Filed: Jun. 11, 1979

[51] Int. Cl.³ .............................................. B23K 27/00
[52] U.S. Cl. ...................... 219/121 LL; 219/121 LK; 219/121 LP
[58] Field of Search ................. 219/121 LL, 121 LK, 219/121 L, 121 LM, 121 LP

[56] References Cited

U.S. PATENT DOCUMENTS

| | | | |
|---|---|---|---|
| 3,075,719 | 1/1963 | Hornstein | 242/65 |
| 3,098,143 | 7/1963 | Warmt | 219/384 |
| 3,146,283 | 8/1964 | Da Valle | 264/156 |
| 3,167,641 | 1/1965 | Parmele et al. | 219/384 |
| 3,226,527 | 12/1965 | Harding | 219/384 |
| 3,383,065 | 5/1968 | Bergeron et al. | 242/56.8 |
| 3,419,706 | 12/1968 | Lohrmann | 219/384 |
| 3,475,591 | 10/1969 | Fujii et al. | 219/384 |
| 3,538,308 | 11/1970 | Schmidt | 219/384 |
| 3,582,466 | 6/1971 | Quirk | 350/52 X |
| 3,594,261 | 7/1971 | Broerman | 161/62 |
| 3,617,702 | 11/1971 | Flournoy | 219/384 |
| 3,742,182 | 6/1973 | Saunders | 219/121 LM |
| 3,757,077 | 9/1973 | Siclari et al. | 219/121 LG |
| 3,808,394 | 4/1974 | Mominee et al. | 219/121 LM |
| 3,858,821 | 1/1975 | Beard et al. | 242/66 |
| 3,915,264 | 10/1975 | Ohi | 242/75.4 X |
| 3,946,960 | 3/1976 | Hunter | 242/65 |
| 4,028,525 | 6/1977 | Mominee et al. | 219/121 LK |

Primary Examiner—Clarence L. Albritton

[57] ABSTRACT

Disclosed is a method and apparatus for perforating cigarette tipping paper which holes may be obvious or which may be so small as to be "non-obvious". The holes produced range upward from about 0.025 mm. (0.001") or 0.051 mm. (0.002") and are rectangular. As shown in FIG. 4 the web (40) of tipping paper is moved in the direction of the arrow (44) about idler rolls (82) and in contact with at least one rotatable mask (100). The web (40) is in contact with the outer peripheral surface of the cylindrical wall of the masks (100) over a small area (90). The masks (100) are driven, usually at a greater linear rate of speed, in the opposite direction as indicated by the arrows (122) with respect to the movement (44) of the web (40). A laser beam (140) is projected against the interior surface of the cylindrical wall of the masks (100) in alignment with elongated slots (128, 132) which slots (128, 132) extend through the cylindrical wall of the masks (100). As a result of the movement of the masks and the web (40) of tipping paper, discrete areas of the sheet material (40) become sequentially aligned with the laser beam (140) which discrete areas are vaporized to form the holes (12, 14) of the web (40). The size of the holes (12, 14) of the web (40) are determined in one direction (parallel to the axis of rotation of the masks (100) and transverse to the machine direction) by the width of the laser beam (140) in the same direction and measured in its interface with the web (40). In the opposite direction, i.e. the machine direction, the dimensions of the holes (12, 14) are determined in part by the width of the slots (128, 132) and in part by the relative speed of motion of the web (40) and the masks (100) in opposite directions.

5 Claims, 4 Drawing Figures

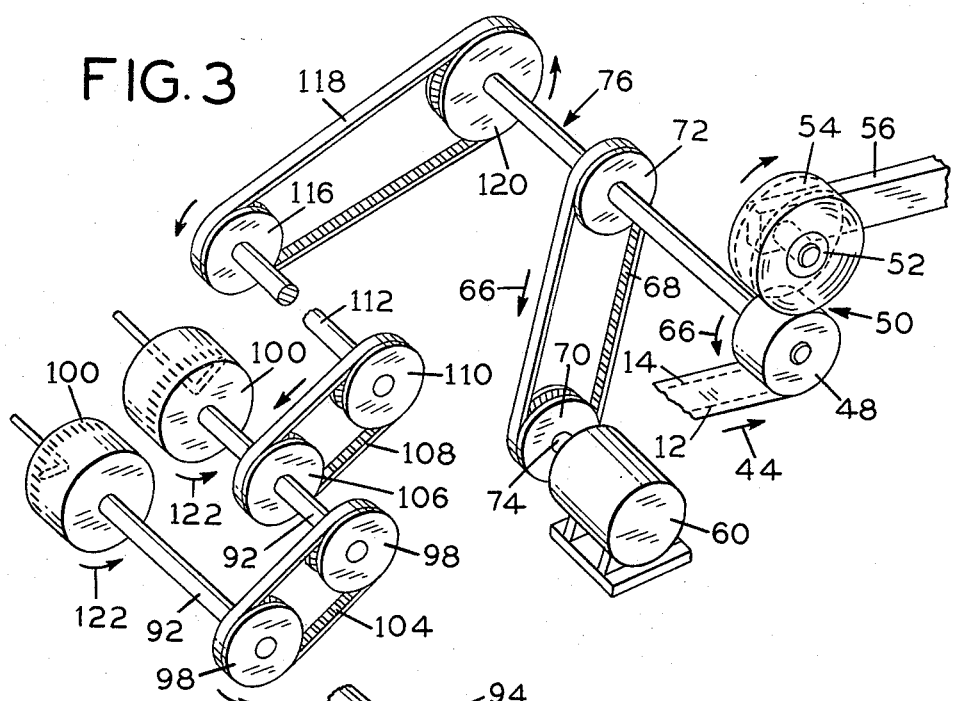

MICROPERFORATION OF CIGARETTE TIPPING PAPER BY USE OF LASER BEAM

DESCRIPTION

1. Background of the Invention

This invention relates to the perforation of cigarette tipping paper and, in particular, to such perforations which are so small as to be "non-obvious".

In the past, most large volume cigarettes have had tar levels generally in the range of 17 mg. to 21 mg. Many of these are now being reduced to 15 mg. or below, which category is referred to as "low tar". Some cigarettes have been reduced to 5 mg, and below, which category is referred to as "ultra low tar".

In achieving the ultra low tar category, cigarette tipping paper is perforated in order to dilute the smoke to the levels required. Various perforating systems have been used including pins, electrostatic perforation, and lasers. In this ultra low category, the holes produced by perforation generally range upward to as large as 0.356 mm.×0.381 mm. (0.014"×0.015") with approximately 28 holes per 2.54 cm. (one inch), with anywhere from 1 to 7 rows of holes. It will be appreciated that holes of this size are visible to the naked eye, although they are very small and generally unobtrusive.

In the low tar category, since less dilution is necessary, it is possible to use smaller holes. In this category, holes as large as 0.102 mm.×0.203 mm. (0.004"×0.008") to 0.203 mm.×0.305 mm. (0.008"×0.012"), or the like, have been used though holes as small as 0.076 mm. (0.003") in width are also used.

Efforts have been made to produce low tar cigarettes with non-obvious holes in order that the cigarettes may meet the low tar category, while at the same time there will be no obvious holes which might indicate that the cigarette was no longer the same as the consumer had previously purchased. To this end, porous tipping paper has been used but this requires great care with respect to printing and the like, in order to insure that the porosity of the paper is maintained at a prescribed level. Furthermore, there have been difficulties in producing a porous tipping paper of a uniform porosity.

Efforts to produce cigarettes of the low tar variety with non-obvious holes by means of electrostatic perforation or by use of laser techniques have proven difficult and expensive. Whether a hole is "obvious" or not depends upon the visual acuity of the observer as well as the degree of attention he gives to the subject and his own subjective judgment. Obviousness also depends in part on the color and pattern of any printing on the paper itself. As a crude rule of thumb, however, any hole of a diameter or width greater than about 0.076 mm. (0.003") may be considered obvious and any hole below that size as non-obvious. Electrostatic perforation is not dependable with respect to the number and size of the holes. The spark may vary in size, thereby varying the size of the hole produced. Similarly, the spark may vary in intensity, which again varies the size of the hole produced. A particular problem with electrostatic perforating is that the sparks tend to follow the path of least resistance. Frequently, this results in a spark passing through an existing hole created by an adjacent electrode rather than creating a new hole. This, in turn, limits how closely together the holes may be spaced, again creating a problem for the cigarette manufacturer. The band of small holes produced by electrostatic methods can be as wide as 5 mm. due in part to the fact that the holes may not be too closely spaced for the reason just mentioned. This wide 5 mm. band requires that the glue used for gluing the tipping paper to the filter plug must have a gap with no glue of slightly over 5 mm. to insure that the glue does not plug up the holes. This creates great problems during cigarette manufacture when applying the glue and can result in puckering of the tipping paper in the non-glued area when the cigarette is smoked.

The micro laser techniques produce holes that are rectangular (including substantially square holes) but with rounded corners. Holes produced by these techniques have been made as small as 0.025 mm. (0.001"), 0.051 mm. (0.002") or 0.076 mm. (0.003") with 110 holes per inch (2.54 cm.). Such methods do produce a much more uniform product and, thus, a more uniform tar delivery in the finished cigarette. However, the control of the laser requires expensive equipment and, in addition to the laser cost, it is also difficult to vary the number of holes per inch (2.54 cm.) in order to meet the requirements of different products.

Still further, this method is limited in that changing the hole size is even more complicated than changing the number of holes per inch because of changes required in the laser power, beam focus or the beam-splitting apparatus. Additionally, this beam-splitting technique for lasers is relatively slow in overall production.

2. Prior Art

U.S. Pat. No. 3,742,182 discloses perforating sheet material by exposing the same through a perforated mask to a laser beam and providing relative movement between the beam and the mask.

This technique has been adapted to cigarette tipping paper of the low and ultra low tar categories as disclosed in our copending U.S. application Ser. No. 640,322, filed Dec. 12, 1975. As disclosed in that application, a cylindrical mask is mounted for free rotation between an unwind and a rewind machine. The mask has a plurality of small apertures therethrough around its periphery. One or more laser beams are then projected outwardly from within the mask against the peripheral wall thereof. Cigarette tipping paper is entrained about the outside of the mask and, as it is unwound from one reel and rewound on a second reel, the tipping paper rotates the mask in unison therewith, i.e. the peripheral speed of the mask circumference is the same as the linear speed of the driving web of tipping paper. As each aperture in the mask passes by its associated laser beam which is continuously operated, the area of cigarette tipping paper exposed to the beam is vaporized. When endeavoring to use this system to produce non-obvious holes for the low tar category of cigarettes, however, it has proved very difficult to make the apertures in the mask as small as required. Furthermore, in use, these small apertures in the mask do not clean well or easily.

SUMMARY OF THE INVENTION

The deficiencies of the existing methods of perforating cigarette tipping paper are overcome by the present invention in which the tipping paper is moved from an unwind station to a rewind station between which is positioned the laser perforating station. At the laser perforating station, the web passes into contact for a selected distance with the outside surface of a rotatable mask. The web is driven by the take-up or rewind at a constant speed and the rotating mask is also driven but in the opposite direction to the web, i.e. there is relative movement not only between the laser beam and the rotating mask but also between the rotating mask and the web of material being acted upon. In this way, it is possible to produce a large number of substantially microscopic holes so small as to be not obvious to the viewer. At the same time, the size, number and location of the holes can be very accurately controlled and easily changed.

In this system, the mask serves to chop the beam into many small segments, thus producing many more holes all of which are smaller than the corresponding apertures in the mask. This is unlike the prior art laser devices in which the apertures in the mask generally control the size of the holes in the finished product, either entirely or in at least one direction. In the present system, it is also possible to change the number of holes and even their size merely by changing pulleys on the drive system in order to have a pulley set up of a different ratio. Still further, the present system lends itself to very rapid production rates in comparison with other laser methods, thus further contributing not only to quality but to the economics of the process.

Surprisingly, this system has proved unexpectedly versatile and economical. Not only can it produce non-obvious holes in a quantity sufficient to reduce a normal cigarette from 17 mg. or more of tar to 15 mg. or even 14 mg. of tar, but it can be used to produce obvious holes sufficient in number to reduce the tar content to as low as 10 mg. With further development, it is expected that it can be used to provide an even wider range of tipping papers suitable for cigarettes having still lower tar ratings. Also, it has unexpectedly resulted in a greater mask life than that experienced with the process and apparatus disclosed in our copending application mentioned above.

Of particular advantage is the fact that changes necessary for various products can be accomplished quickly and simply by such expedients as by changing the mask or one pulley, whereas other systems for producing microperforations by lasers have required complex lens adjustments, changing of lenses, adjustment of power, adjustment of prisms and so on.

BRIEF DESCRIPTION OF THE DRAWINGS

FIG. 3 is a schematic showing of the drive pulleys and timing belts for the device as viewed in FIG. 2; and FIG. 4 is a perspective view of the rotating masks and their associated lasers taken generally in the direction of the arrow 4 in FIG. 1.

DETAILED DESCRIPTION OF THE PREFERRED EMBODIMENT

Figure 1:
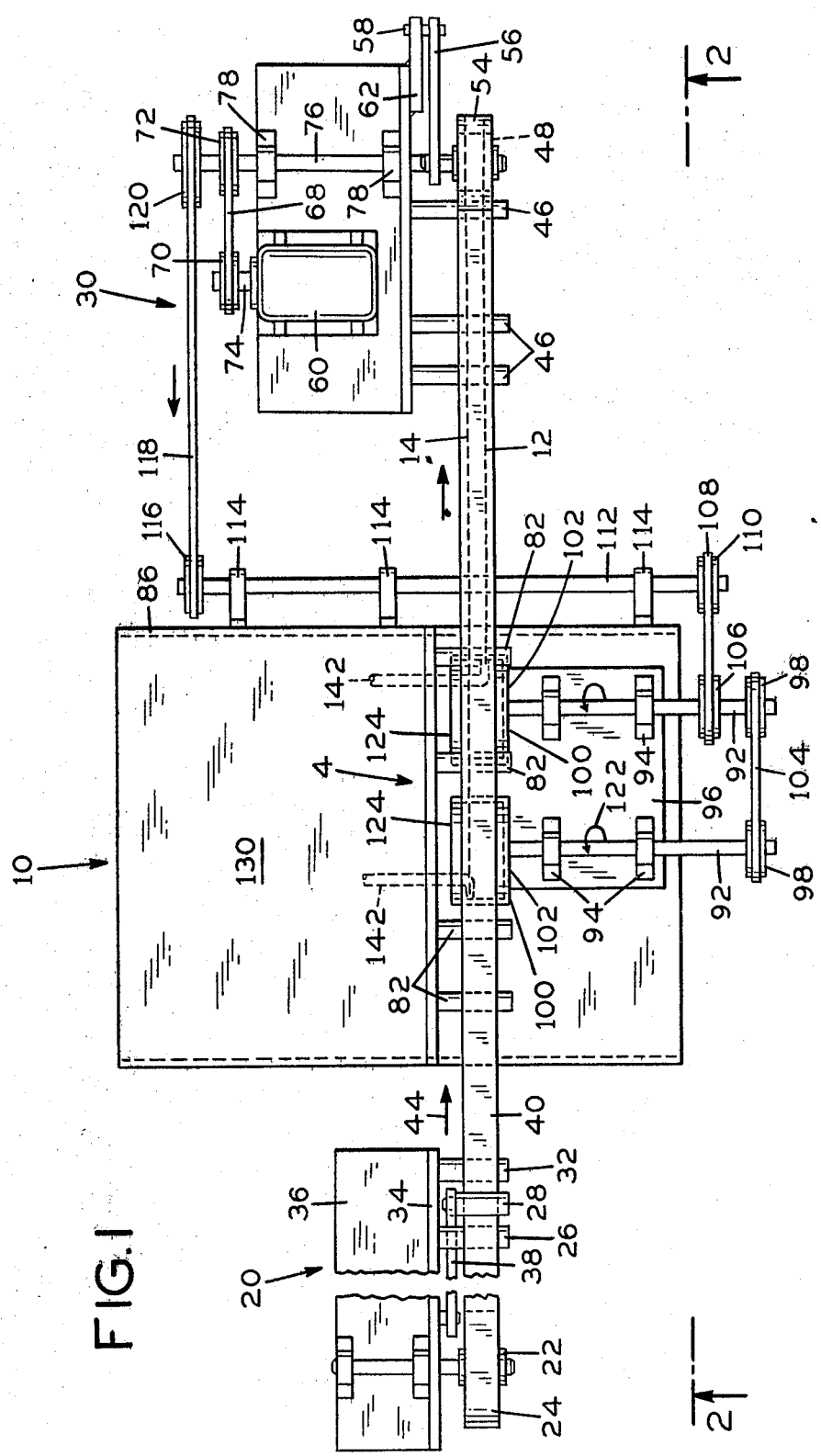
FIG. 1 is a somewhat schematic plan view of the apparatus of the invention.
Figure 2:
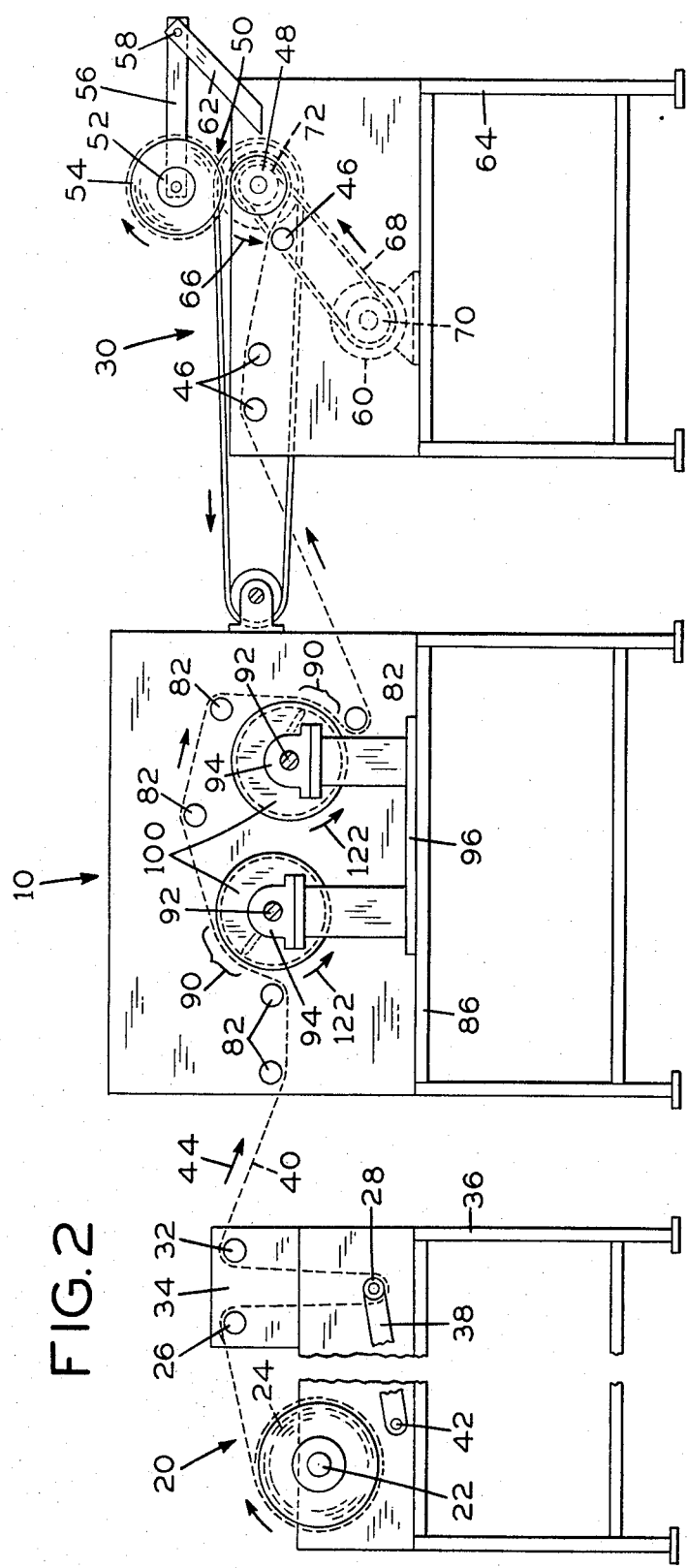
FIG. 2 is an elevational view, largely schematic, taken along line 2—2 of FIG. 1.

As shown in FIGS. 1 and 2, the apparatus comprises three related units including a laser perforating station, generally indicated at 10, which is positioned between an unwind station 20 and a rewind station 30. At the unwind station 20, there is mounted a roller 22 for receipt of a roll of tipping paper 24 which roll is of "bobbin" width. In the cigarette manufacturing industry, two cigarettes are formed and brought into aligned relationship with each other but spaced apart. A double length filter is then positioned between the adjacent ends of two cigarettes. The cigarette tipping paper is then wrapped around and adhered to the filter and to the cigarette paper adjacent the adjacent ends of the two cigarettes. Subsequently, the two cigarettes are separated by slitting through the double length filter and filter tipping paper. This double width of the tipping paper is, therefore, slightly wider than the length of the uncut double filter. Furthermore, this width of tipping paper is referred to as "bobbin" width. These tipping papers are generally originally manufactured in widths ranging up to approximately 1.12 m. (44″) or more and are then slit to bobbin width before use with the present invention. The bobbin 24 of filter tipping paper is then run as a web 40 over a fixed axis idler roll 26 down around a movable axis idler roll 28, and again over another fixed axis idler roll 32. The idler rolls 26 and 32 are mounted to a portion 34 of the frame 36 for free rotation about fixed axes. The idler roll 28 is mounted for free rotation to one end of an arm 38 which is pivoted at its other end 42 to the frame 36. As the web 40 is moved in the direction of the arrow 44 by the rewind mechanism, as hereinafter described, the arm 38 may pivot upwardly or downwardly about the axis of its pivot 42 in order to accommodate any "surges" that may occur, thus maintaining a relatively constant tension on the web. This tension may be adjusted, augmented, or otherwise modified by means of springs, weights or fluid activated devices (not shown) acting upon the arm 38 in known manner.

After leaving the unwind station 20, the web of material passes to and through the laser perforating station 10. Details of this station will be presently explained. From the laser perforating station 10, the web 40 passes to the rewind station 30 where it first passes over a series of idler rolls 46 and then around a pull or drive roll 48. The web 40 then passes through a nip 50 between the drive roll 48 and a take-up roll 52. The take-up roll 52 is provided with a core of cardboard, or the like, in known manner and the web 40 is then wrapped around this core (not shown). As the web 40 builds a bobbin 54 on the core, the same increases in diameter; however, the linear speed of the web 40 is governed by the peripheral speed of the pull or drive roll 48, the diameter of which remains constant. Accordingly, the web 40 is passed through the device at a constant speed. In order to compensate for the increase in diameter of the bobbin 54, the take-up roll 52 is mounted for free rotation adjacent one end of an arm 56 which is pivoted at its other end 58 to any suitable portion 62 of the frame 64. As the roll 54 increases in diameter, it will be forced in an arc upwardly about the axis of the pivot 58 while at all times firmly gripping the web 40 between the periphery of the growing bobbin 54 and the surface of the pull or drive roll 48 where they form the nip 50. To insure firm, non-slip gripping of the web between the pull or drive roll 48 and the periphery of the growing bobbin 54, weights, springs or fluid activated devices (not shown) may be applied to the arm 56 to urge the roll 54 firmly toward the roll 48 if the weight built into the apparatus itself is insufficient. To further insure such good gripping at the nip 50, the roll 48 may at least be surfaced with rubber.

A drive motor 60 operates the pull or drive roll 48 to rotate in the direction of the arrow 66 by means of a timing belt 68 and cooperating timing pulleys 70 and 72. The pulley 70 is secured to the output shaft 74 of the motor 60 and the pulley 72 is secured to a shaft 76 mounted in bearings 78 in the frame 64 of the rewind mechanism 30. At its other end, the shaft 76 has secured thereto for rotation therewith the pull or drive roll 48. The motor 60 is also secured to the frame 64.

Between the unwind station 20 and the rewind station 30, the web of material to be treated passes through the laser perforating station 20 as aforesaid. At that station, the web 40 passes over a plurality of freely rotatable idling guide rolls 82 mounted for free rotation on a plate 84 extending upwardly from the frame 86 of the laser perforating station. The location of these guide rolls 82 is shown in FIG. 2. The web 40 also passes into contact with two laser masks 100. The area of contact indicated by the numeral 90 over which the web 40 contacts with each of the masks 100 is relatively small being only a fraction of the circumference of the masks 100. Typically, this distance 90 may be up to about 30° of the circumference of each mask. As shown in more detail in FIG. 4, each of these masks is provided with at least one row of apertures, which apertures extend through the cylindrical periphery of the masks as more fully described hereinafter.

One end of the cylindrical masks 100 may be closed by plate 102 which, in turn, is secured to one of the shafts 92 journaled in bearings 94 and, in turn, mounted to a suitable platform 96 of the frame 86. Each of the shafts 92 has secured thereto a timing pulley 98 and a timing belt 104 is entrained about and engaged with both of the timing pulleys 98 which are, preferably, of the same size and of the same number of teeth. The shaft 92 that is to the right in FIGS. 1 and 2, carries a second timing pulley 106 engaged with another timing belt 108 which is engaged also with a timing pulley 110 secured to jack shaft 112 mounted in bearings 114, in turn, secured to the frame 86 of the laser perforating station. At its end opposite to the end carrying the timing pulley 110, the jack shaft 112 has secured thereto another timing pulley 116 about which is entrained a timing belt 118 which is also entrained about another timing pulley 120 secured to the pull or drive shaft 76. Each of the timing pulleys 70, 72, 98, 106, 110, 116 and 120, as well as the timing belts 68, 104, 108 and 118, may be of any known conventional type. They could, for example, be sprockets and chains, but, preferably, are timing belts and pulleys which have mating teeth and grooves therein in known manner.

As will be apparent, operation of the motor 60 drives shaft 76 which not only moves the web 40 through the device by virtue of the nip 50 gripping and moving the web 40, but also the motor 60 and shaft 76 operate to rotate the masks 100 through the toothed timing pulleys and belts 120, 118, 116, 112, 110, 108, 106, 98 and 104. Thus, while the web 40 moves in the direction of arrow 44, the masks 100 will move in the direction of the arrows 122. That is to say, that at their point of contact with the web 40, the surfaces of the masks are moving in the opposite direction from the direction of movement of the web 40.

The masks 100, on their ends opposite to the ends having the closure plates 102, are open. These ends 124 face the laser apparatus 130 which generates at least one laser beam 140 for each of the masks 100. Each laser beam 140 enters into its associated mask 100 through the open end 124 thereof and, preferably, generally parallel to the axis of rotation of the mask 100 and its associated drive shaft 92. Inside the masks 100, at a point generally indicated at 126, each of the laser beams 140 is bent by any suitable means, such as a mirror 146 to impinge upon the inside of the peripheral wall of the mask 100 and in alignment with a row of apertures through the peripheral wall.

In FIG. 4, each laser beam 140 is shown as passing through a conduit 142 having a bend 144 therein. Mounted within the conduit 142 at the bend 144 is a mirror 146 which redirects the beam 140 as shown. The terminal portion 148 of the conduit 142 carries within it a lens 150 mounted for movement longitudinally along the portion 148 of the conduit so that the lens 150 may focus the beam 140 properly upon the web 40.

In FIG. 4, each mask is shown as having one row of apertures 128 and 132. As shown therein, each of the apertures in each of the rows 128, 132 is elongated in the direction transverse to the movement of the web 40 and parallel to the axis of the shaft 92. It has been found difficult or impossible to insure absolutely perfect rotation of the masks without any wobbling. As such, there is a tendency for the apertures (if not elongated) to "run out" of alignment with their associated laser beam, thus resulting in a partial hole or no hole at all in the web 40. By elongating the apertures as described, to the extent necessary to compensate for any such run out, accuracy is assured with respect to the formation of every hole 12, 14. Various metals may be used for the mask, but is presently preferred to use copper for production equipment due to its high rate of heat dissipation. The slots may be formed by any conventional means, including drilling, sawing, punching, broaching or etching, but the use of an electrode drilling machine for the task is presently preferred. A copper tube or cylinder having a circumference of 71.12 cm. (28") and a wall thickness of 2.5 mm. (0.1") is suitable, although it is preferred to reduce this to 0.058 mm. (0.02") to 0.889 mm. (0.035") in the area of the slots.

The size of the holes 12, 14 produced in the web in the direction of the elongation of the apertures in the mask will be determined by the width of the laser beam 140 in the direction of elongation of the apertures and measured where the beam impinges upon the web 40. In the opposite direction, i.e. at right angles to the elongated dimension of the apertures in the mask, the dimension of the holes 12, 14 produced in the web 40 will be in part determined by the width of the apertures in the mask in this direction and in part determined by the speed of relative movement between the web 40 and the mask 100. Accordingly, the holes produced in the web 40 will be essentially rectangular. Indeed, in many instances, the holes 12, 14 produced in the web will be elongated in the machine direction even though the apertures in the mask are elongated transverse to the machine direction.

It will be appreciated that the number of holes per inch (2.54 cm.) produced in the traveling web will depend in part upon the relative speeds between the web and the periphery of the mask along their point of contact, and also upon the number of apertures per inch (2.54 cm.) in the mask periphery. As will be apparent to those skilled in the art, the speed of relative motion between the web 40 and the adjacent surface of the mask along their point of mutual contact can be controlled by the relative diameters (or the number of teeth) in the various timing pulleys 70, 72, 120, 116, 110, 106 and 98. It is not necessary, however, to change all of the timing pulleys in most instances. Only the pulley 116 (hereinafter the change pulley) need be altered to vary the ratio of the drive system.

Generally, tipping paper for use with filter tip cigarettes is specified in accordance with a defined "pressure drop". This involves passing air at a constant rate through the material and measuring the pressure in mm. of water, on both sides of the sample. The difference is the "pressure drop" and the smaller the number, the less resistance the sample has to the passage of the air, i.e. the smaller the number, the most porous the paper. Previously known low tar tipping paper exhibits pressure drop readings varying from 25 to 5 and ultra low tar tipping paper can be as low as 0.4 or 0.5. The present system can produce, within very narrow tolerances along any given bobbin length of tipping paper, any selected pressure drop from as low as 10 to as high as 200, depending upon the customer requirements.

The Various Dimensions

It must be appreciated that depending upon the pressure drop required for a particular product, it may be necessary to change the change pulley 116 in order to vary the drive ratio as hereinafter described, or it may be necessary to change the masks to masks having smaller or larger apertures or smaller or larger numbers of apertures per inch (2.54 cm.), or it may be necessary to do both. Generally, further changes or adjustments to the apparatus will not be required. It is presently preferred to use masks having a circumference of 71.12 cm. (28") and to use a pull or drive roll 48 having a circumference of 60.94 cm. (24"). There is no preferred ratio to the drive system since the same is dictated by customer requirements for pressure drop. In one example, however, the timing pulleys 98, 106 and 110, as well as the change pulley 116, have twenty-four teeth and the driving pulley 120 has seventy-two teeth. This gives a ratio of 3:1 to the system. That is, for each rotation of the shaft 76, there will be one rotation of the pull or drive roll 48 but three rotations for each of the masks 100. At present it is preferred to run with a linear web speed of about 243.84 m. (800 feet) per minute; however, experiments have been run with a web speed of 91.44 m. (300 feet) per minute up to and including 457.2 m. (1,500 feet) per minute and at several speeds intermediate these two speeds. Experiments have also been run using change pulleys 116 having from 36 down to 18 teeth and providing an overall ratio of from 2:1 to 4:1 for the drive system. That is to say, that with such variation in the change pulley 116, it was possible to change the number of revolutions which each mask made for one revolution of the pull or drive roll 48 from two to four. However, ratios outside of this range are also contemplated. By merely changing the pulley 116, various ratios of speeds can be achieved readily.

As previously mentioned, the apertures 128 and 132 in the masks are actually slots which have their long dimension parallel to the axis of the drum-shaped masks 100. For use with a single laser, it has been found that a slot of 3.175 mm. (0.125") length is adequate, i.e. 3.175 mm. (0.125") measured parallel to the axis of the mask. It will be appreciated that it is the dimension of the laser beam at its point of contact with the paper as measured in the direction parallel to the slot in the mask which determines this dimension of the hole in the web. It is only necessary that the length of the slot in its longest direction be sufficient to compensate for any wobble or "run out" which might otherwise occur. If a pair of laser beams are used for a single mask in order to provide a pair of rows of holes adjacent each other, then, in that event, the slots 128 and 132 in the mask may conveniently be made long enough to accommodate both laser beams and the distance between them, plus additional spacing to compensate for any wobble or "run out". This makes for economical production of the mask since both laser beams operate through the same set of slots. In most low tar applications where the pressure drop desired is great and the reduction in tar relatively small and where non-obvious holes are desired, it is sufficient to use a single laser and a single set of holes for each filter tip as shown in the drawings.

In the direction transverse to the machine direction, the holes produced in the web have a size, as mentioned above, determined by the width of the beam at its point of impingement upon the web. There are a number of ways of adjusting this beam width. For example, the web may be run at the focal point for a particular lens or somewhat closer to the lens, which latter would produce a wider hole. Similarly, one may so focus the lens that either its focus is on the web or some other portion of the projected beam is on the web. Alternatively, different lenses may be used. Using a lens having a beam width at its focal point of 0.051 mm. (0.002"), it has been possible to produce holes having a width transverse to the machine direction of from 0.051 mm. (0.002") to 0.25 mm. (0.01"), although it is expected that it will be possible to reduce this size at least to 0.025 mm. (0.001") by use of a suitable lens.

The width of the slots 128 and 132 as measured in the direction of rotation of the mask (and in the direction of movement of the web) may also vary substantially. Slots 128 and 132 having a width in the machine direction of 0.43 mm. (0.017"), 0.51 mm. (0.020") and 0.58 mm. (0.023") have been tried experimentally in masks having 5, 10, 20 and 28 slots per inch (2.54 cm.) in each row. By varying the above dimensions and machine drive ratios, holes in the web of from 20 to 130 per inch (2.54 cm.) in each row have been produced with the final product having holes in the machine direction of from 0.976 mm. (0.003") to 0.127 mm. (0.005"). The above dimensions are by no means intended to limit the applicability of the present invention and it is anticipated that it will be possible to produce holes in the web as small as 0.051 mm. (0.002") or even as low as 0.025 mm. (0.001") in the machine direction.

Various means for maintaining the openings in the mask clean are contemplated, including compressed air, vacuum, power driven brushes, and the like, either alone or in combination. Such mechanisms are, however, known and need not be shown here.

We claim:

1. In the method of perforating sheet material by sequentially exposing separate discrete areas thereof to a continuously operated fixed laser beam projected through the interior of a movable cylindrical mask having apertures in its cylindrical wall, the improvement comprising providing relative movement between the mask and the laser beam by rotating the mask to bring successive apertures in alignment with said beam as said wall moves in a circular path and also providing relative movement between the mask and the sheet material to be perforated by bringing said sheet material into contact with the exterior of the cylindrical wall of said mask along a portion of its circular path and moving said sheet along a path in a direction opposite to the direction of movement of said cylindrical wall.

2. The method of claim 1 in which the perforations produced are so small as not to be obvious to the naked eye.

3. Apparatus for perforating sheet material comprising a frame, a cylindrically shaped mask rotatably mounted on said frame, at least one extending through the cylindrical wall of said mask, means fixedly mounted on said frame for projecting a continuous laser beam against the inner surface of the cylindrical wall of said mask at a point to periodically align with said opening upon rotation of said mask, means for positioning said sheet material against a portion of the outer surface of said cylindrical wall, and means for providing relative movement between said sheet and said mask so that said mask moves in one direction and said sheet, when in contact with said mask, moves in a direction opposite thereto.

4. The apparatus of claim 3 in which said means for providing relative movement includes a prime mover, said prime mover being drivingly connected to said mask and to said means for moving said sheet whereby the speed of rotation of the mask and the speed of movement of said sheet are interrelated.

5. The apparatus of claim 4 in which the peripheral speed of the cylindrical wall of said mask in said one direction is greater than the linear speed of said sheet in said opposite direction.

* * * * *

UNITED STATES PATENT AND TRADEMARK OFFICE
CERTIFICATE OF CORRECTION

PATENT NO. : 4,302,654
DATED : November 24, 1981
INVENTOR(S) : William Thomas Bennett et al.

It is certified that error appears in the above-identified patent and that said Letters Patent is hereby corrected as shown below:

On the title page Insert

-- (73) Assignee: American Brands, Inc.
              New York, N. Y. --

Abstract, line 27, "in its" should read -- at its --

Signed and Sealed this

Third Day of January 1984

[SEAL]

Attest:

GERALD J. MOSSINGHOFF

Attesting Officer                 Commissioner of Patents and Trademarks